(12) United States Patent
Wobben

(10) Patent No.: US 6,437,996 B1
(45) Date of Patent: Aug. 20, 2002

(54) ELECTRICAL POWER TRANSMISSION SYSTEM

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 0 days.

(21) Appl. No.: 09/787,385

(22) PCT Filed: Jul. 29, 1999

(86) PCT No.: PCT/EP99/05434

§ 371 (c)(1),
(2), (4) Date: May 31, 2001

(87) PCT Pub. No.: WO00/21186

PCT Pub. Date: Apr. 13, 2000

(30) Foreign Application Priority Data

Oct. 5, 1998 (DE) .......................... 198 45 903

(51) Int. Cl.$^7$ .............................................. H02M 5/45
(52) U.S. Cl. ...................................................... 363/37
(58) Field of Search .............................. 363/34, 35, 37, 363/95, 97, 131

(56) References Cited

U.S. PATENT DOCUMENTS 4,992,721 A * 2/1991 Latos ........................... 322/10
5,055,989 A    10/1991 Carroll et al. ................. 363/36
5,225,973 A *  7/1993 Patel et al. .................... 363/42
6,128,204 A * 10/2000 Munro et al. .................. 363/41
6,166,929 A * 12/2000 Ma et al. ....................... 363/37

FOREIGN PATENT DOCUMENTS

WO    WO 97/17753    5/1997
WO    WO 97/45908    12/1997

* cited by examiner

Primary Examiner—Matthew Nguyen
(74) Attorney, Agent, or Firm—Seed IP Law Group, PLLC

(57) ABSTRACT

The invention concerns an electrical energy transmission installation for the transmission of electrical energy from a generator producing a first AC voltage by way of a transmission line into an electrical AC voltage network, comprising a circuit arrangement which converts the first AC voltage produced by the generator into a first DC voltage and feeds it into the transmission line, and a first inverter which is connected to the output of the transmission line and converts the first DC voltage into a second AC voltage and feeds it into the AC voltage network. The particularity of the invention is that the circuit arrangement has a current converter circuit which converts the first AC voltage produced by the generator into a third AC voltage, a first transformer which converts the third AC voltage into a fourth AC voltage, and a first rectifier which converts the fourth AC voltage into the first DC voltage.

18 Claims, 4 Drawing Sheets

ELECTRICAL POWER TRANSMISSION SYSTEM

CONTINUING DATA

This application is a 371 of PCT/E99/05434 filed on Jul. 29, 1999.

BACKGROUND OF THE INVENTION

1. Field of the Invention

The invention concerns an electrical energy transmission installation for the transmission of electrical energy from a generator producing a first AC voltage by way of a transmission line into an electrical AC voltage network, comprising a circuit arrangement which converts the first AC voltage produced by the generator into a first DC voltage and feeds it into the transmission line, and a first inverter which is connected to the output of the transmission line and converts the first DC voltage into a second AC voltage and feeds it into the AC voltage network.

2. Description of the Related Art

Power-production installations such as electrical generators are usually connected directly to the public supply network or system. That also applies in regard to wind power installations. If however there is a relatively great distance to a possible connection point to the public supply network, a transmission line then has to be provided. If in that case the AC voltage produced by the generator is fed directly into the transmission line, then reactive powers and therewith increased line losses occur on the transmission line and, in the case of longer distances, instabilities, because the impedance of such an AC line comprises inductance, capacitance and real resistance. An AC line also generates an electromagnetic field which can result in unwanted electromagnetic compatibility problems.

BRIEF SUMMARY OF THE INVENTION

Aspects of the present invention reside in an apparatus for the transmission of electrical energy from a generator which produces a first AC voltage by way of a direct current transmission line to an electrical AC voltage network. Aspects include a circuit arrangement comprising a first rectifier, a booster connected on the output side thereof, and a first inverter which is in turn connected on the output side of the booster. Further aspects include the first rectifier converting the first AC voltage produced by the generator into a first DC voltage, the booster transforming the first DC voltage into a constant DC voltage and the first inverter converting the constant DC voltage made available by the booster into a second AC voltage.

BRIEF DESCRIPTION OF THE SEVERAL VIEWS OF THE DRAWINGS

Preferred embodiments of the invention are described in greater detail hereinafter with reference to the accompanying drawings in which.

DETAILED DESCRIPTION OF THE INVENTION

Figure 1:
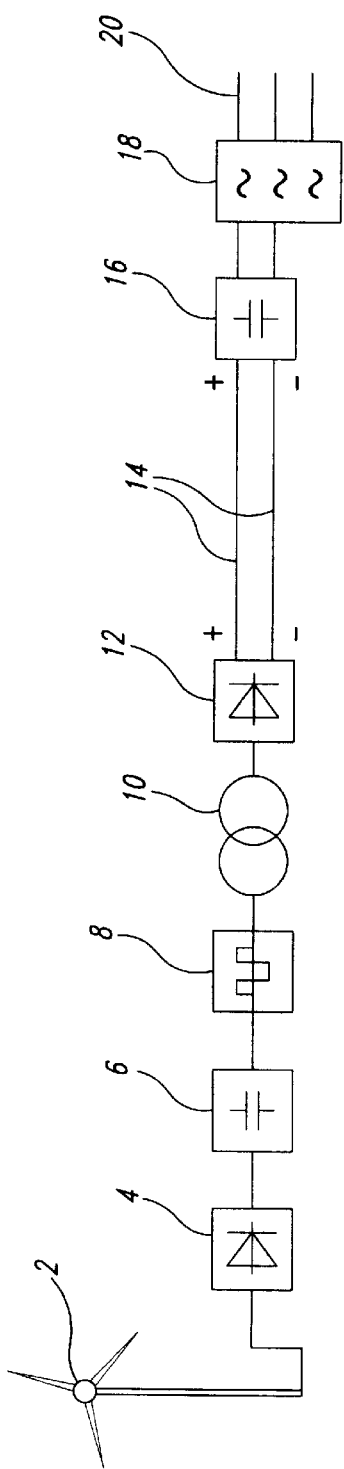
FIG. 1 schematically shows a block circuit diagram illustrating the entire electrical energy transmission installation with a wind power installation connected thereto at the input side and a public supply network connected thereto at the output side.

In order to avoid the above-indicated disadvantages, the first AC voltage produced by the generator is converted into a first DC voltage which is then fed into the transmission line. At the end of the transmission line the DC voltage is converted into a second AC voltage and fed into the public supply network which in fact is an AC voltage network. In this respect the converted second AC voltage should desirably at least substantially correspond to that of the public supply network in order to avoid unwanted compensating currents and harmonics. In that known high-voltage DC transmission system, referred to in abbreviated form as the HT-DC transmission system, a direct current is impressed into the transmission line by means of DC chokes, wherein the DC voltage is appropriately adjusted in dependence on the control of the associated rectifiers and inverters.

The present invention now provides an electrical energy transmission installation of the kind set forth in the opening part of this specification, in which the circuit arrangement has a current converter circuit which converts the first AC voltage produced by the generator into a third AC voltage, a first transformer which converts the third AC voltage into a fourth AC voltage, and a first rectifier which converts the fourth AC voltage into the first DC voltage.

The circuit arrangement designed in accordance with the invention makes it possible in a simple manner in particular to produce high DC voltages which are to be fed into the transmission line, thereby permitting the transmission of electrical energy in a wide power range on the transmission line.

In the installation according to the invention the high DC voltage which is fed into the transmission line can preferably be kept constant as a base value over the entire power range while the current correspondingly changes linearly as a function of the power to be transmitted, for which purpose the current converter circuit and/or the first rectifier regulates to a constant value the first DC voltage which is produced by it and fed into the transmission line. That eliminates the DC chokes which are required in the known high-voltage DC transmission.

Preferably, the frequency of the third AC voltage is higher than that of the first AC voltage and should be in particular in a range of between about 500 and 20,000 Hz so that the transformer provided in accordance with the invention takes over the function of a so-called medium-frequency transformer.

The current converter circuit can also convert the first AC voltage which is usually a rotary current voltage, that is to say a three-phase AC voltage, into a single-phase third AC voltage, thereby reducing the apparatus expenditure.

An embodiment which is particularly preferred at the present time is distinguished in that the current converter circuit has a second rectifier which converts the first AC voltage produced by the generator into a second DC voltage and a second inverter which converts the second DC voltage produced by the second rectifier into the third AC voltage. By virtue of the inclusion of such a DC voltage intermediate circuit, it is possible for the downstream-disposed second inverter to be constructed with any number of phases and in particular also to be in the form of a single-phase inverter. Moreover, such a DC voltage intermediate circuit in a simple manner affords the possibility of keeping the level of the input voltage at the second inverter substantially constant, for which purpose a booster is desirably provided in the DC voltage intermediate circuit. More specifically, the second DC voltage produced by the second rectifier is usually roughly linearly dependent on the speed of rotation of the generator and thus correspondingly variable so that it is converted by the booster into a substantially constant DC voltage. In addition the first DC voltage which is produced by the first rectifier from the fourth AC voltage and fed into the transmission line should generally be higher than the second DC voltage of the DC voltage intermediate circuit.

Usually the first rectifier converts the fourth AC voltage into a first DC voltage which is in the range of between about 10 and 500 kV.

The first transformer preferably converts the third AC voltage into a fourth AC voltage at a higher amplitude than that of the third AC voltage in order to implement the desired generation of the high DC voltage which is to be fed into the transmission line.

A filter should preferably be connected between the current converter circuit and the first transformer, which filter desirably has at least one series-connected inductor and at least one parallel-connected capacitor in order substantially to eliminate unwanted harmonics.

To smooth the DC voltages, at least one capacitor should be connected to ground between the first rectifier and the transmission line and/or between the transmission line and the first inverter.

Having regard to the high DC voltage which is fed in by the transmission line the high-voltage switches of the first inverter at the feed-line location must bear a correspondingly high dielectric strength. In order to reduce the dielectric strength at the high-voltage switches, it is therefore to proposed that the first inverter preferably be formed from a plurality of inverter portions which are connected in series. In a development of this configuration the first inverter is formed from a plurality of series-connected inverter portions of an even number and the connecting point between the first half of the number and the second half of the number of inverter portions is at ground potential.

For galvanic separation and for voltage matching of the energy transmission installation with respect to the AC voltage network or public supply network, the first inverter can be connected to the AC voltage network by way of a second transformer. For the situation where the first inverter comprises a plurality of inverter portions in the above-described manner, the second transformer has a plurality of inductively series-coupled primary winding arrangements corresponding to the number of inverter portions and a common secondary winding arrangement, wherein a respective primary winding arrangement is connected to each inverter portion so that the second transformer implements the addition of the individual outputs of the inverter portions.

Further preferred embodiments of the invention are characterized in the appendant claims.

The above-described energy transmission installation according to the invention is suitable in particular for connecting wind power installations to the public supply network when relatively long distances from the respective wind farm to a possible connecting point have to be bridged.

In the embodiment described hereinafter the electrical generator whose generated energy is to be fed into a public supply network 20 by means of a transmission line 14 over relatively great distances is part of a wind power installation as can be diagrammatically seen from FIG. 1. It should nonetheless be noted at this point that the manner of driving the electrical generator 2 has in principle no influence on the mode of operation of the circuit described hereinafter and as an alternative for example the electrical generator 2 can also be driven by water power or by the combustion of fossil materials.

As can be seen from FIG. 1 the electrical generator 2 of the wind power installation is connected to a current converter circuit which has a first rectifier 4, a rectifier intermediate circuit 6 and a first inverter 8. A medium-frequency transformer 10 is connected between the output of the first inverter 8 and the input of a second rectifier 12. Connected to the output of the second rectifier 12 is the transmission line 14 on which the DC voltage produced by the second rectifier 12 is transmitted over a relatively great distance. The transmission line 14 is connected to a filter 16, to the output side of which is connected a second inverter 18 which is connected with its output to the public supply network 20. The public supply network 20 involves a usual three-phase mains system at the usual frequency of 50 Hz or 60 Hz.

The electrical generator 2 of the wind power installation shown in FIG. 1 produces a three-phase or six-phase AC voltage and feeds it into the first rectifier 4 which converts the three-phase AC voltage into a DC voltage. The first rectifier 4 is a normal three-phase or six-phase full-wave rectifier which converts the positive half-wave of each phase into a positive partial DC voltage on the positive "limb" L1 and the negative half-wave of each phase into a negative partial DC voltage on the negative "limb" L2 (see FIG. 2). It should be noted at this point that the electrical generator 2 can naturally as an alternative also produce for example a single-phase AC voltage, for which purpose then the first rectifier must be in the form of a single-phase rectifier.

The DC voltage produced by the first rectifier 4 is applied to the DC voltage intermediate circuit 6, at the input of which is provided a first capacitor 22 connected between the positive limb L1 and the negative limb L2. As the DC voltage produced by the first rectifier 4 is roughly linearly dependent on the speed of rotation of the electrical generator 2, the DC voltage intermediate circuit 6 includes a booster which transforms that variable DC voltage into a constant DC voltage (see FIG. 2). This booster has a first inductor 24, an IGBT (Insulated Gate Bipolar Transistor) 26 connected to the output of the inductor and connected in parallel between the positive limb L1 and the negative limb L2, a diode 28 which is also connected to the output of the inductor 24 and which is connected in series in the positive limb L1, and at the output a second capacitor 30 connected between the positive limb L1 and the negative limb L2 for smoothing the DC voltage.

Figure 2:
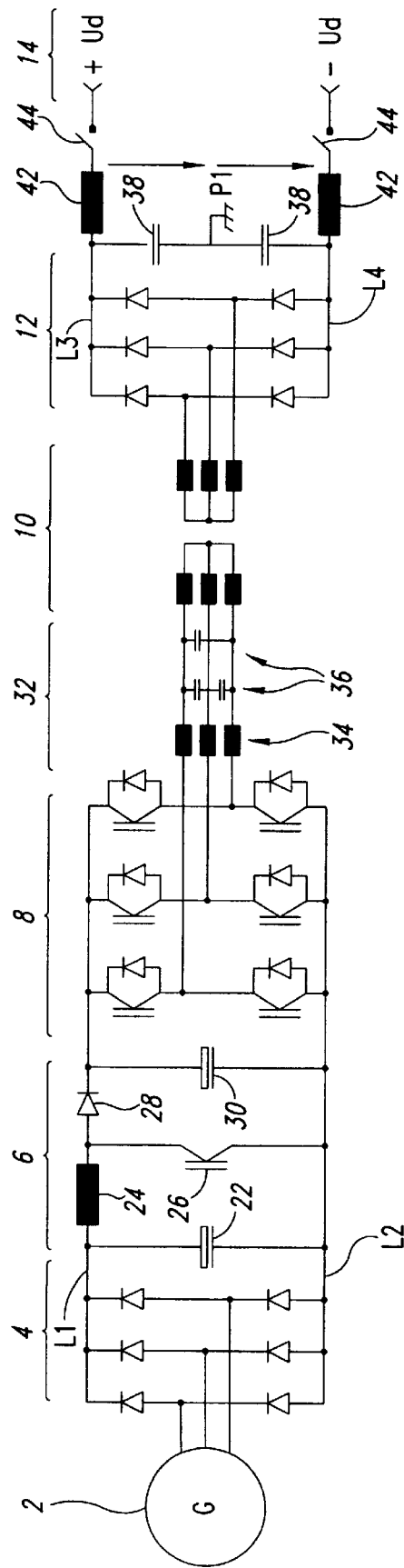
FIG. 2 shows a more detailed circuit diagram of the arrangement of a first rectifier, to the input of which the electrical generator of the wind power installation is connected, a DC voltage intermediate circuit, a first inverter, a filter, a medium-frequency transformer and a second rectifier to the output of which the transmission line is connected.

Connected to the output of the DC voltage intermediate circuit 6 in the embodiment shown in FIG. 2 is a three-phase first inverter 8 which converts the DC voltage into a three-phase AC voltage again, more specifically at a frequency of between about 500 and 20,000 Hz. Connected on the output side of the first inverter 8 is a filter 32 comprising series-connected inductors 34 and parallel-connected capacitors 36. The medium-frequency transformer 10 is connected to the filter 32. As the AC voltage produced by the first inverter 8 is three-phase the medium-frequency transformer 10 is necessarily a three-phase transformer. In the embodiment shown in FIG. 2 the primary and secondary windings of the medium-frequency transformer 10 are each connected in a star configuration. It will be appreciated however that as an alternative it is also possible for the windings to be connected in a delta configuration.

The medium-frequency transformer 10 not only provides for a potential separation action but also for a high voltage step-up action, for example from 400 V per phase on the primary side to 70 kV per phase on the secondary side.

Then the second rectifier 12 converts the three-phase AC voltage which is upwardly transformed by the medium-frequency transformer 10 into a high DC voltage. Because of the three-phase input AC voltage the second rectifier 12 which is a full-wave high-voltage rectifier is in the form of a three-phase rectifier, wherein similarly to the case with the first rectifier 4, the positive half-wave of each phase is converted into a positive high partial DC voltage +Ud on the positive limb L3 and the negative half-wave of each phase is converted into a negative high partial DC voltage −Ud on the negative limb L4, in each case with respect to the point P1 in FIG. 2, which in the illustrated embodiment is symmetrically between the two limbs L3 and L4 at earth potential so that the voltage difference between the two limbs L3 and L4 is 2Ud.

For smoothing the high DC voltage produced by the second rectifier 12, connected between the two limbs L3 and L4 is a capacitance means which, in the embodiment shown in FIG. 2, comprises two series-connected capacitors 38 whose connecting point P1 is at ground potential. In order to produce the same magnitude in terms of voltage difference between the positive limb L3 and the connecting point P1 on the one hand and between the connecting point P1 and the negative limb L4 on the other hand, both capacitors 38 should involve the same impedance values.

It should be noted at this point that the first inverter 8, the filter 32, the medium-frequency transformer 10 and the second rectifier 12 can as an alternative for example also be of a single-phase nature.

The positive limb L3 and the negative limb L4 in the embodiment illustrated in FIG. 2 are respectively connected by way of a fuse 42 and a disconnecting switch 44 to the associated wires of the transmission line 14 which has two wires.

Thus, by means of the medium-frequency transformer 10 and the second rectifier 12 connected thereto, it is thus possible to produce a high DC voltage, preferably in the range of between about 10 and 500 kV, which is then fed into the transmission line 14.

The high DC voltage which is fed into the transmission line 14 in that way serves as a base value and is kept constant over the entire power range while the current flowing through the transmission line 14 correspondingly alters linearly as a function of the power to be transmitted. Keeping the high DC voltage applied to the transmission line 14 constant is implemented by suitable regulation of the booster contained in the DC voltage intermediate circuit 6, the first inverter 8 and/or the second rectifier 12.

Figure 3:
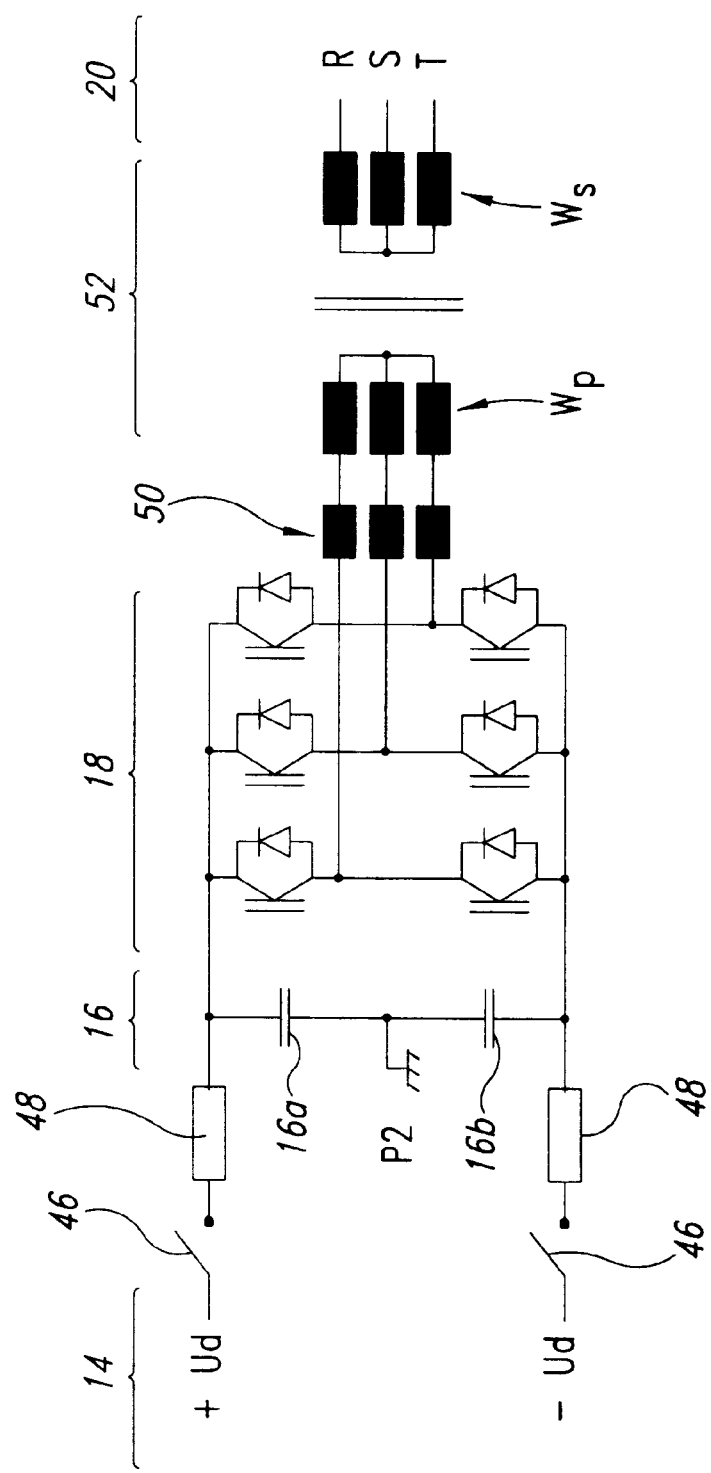
FIG. 3 shows a more detailed circuit diagram of the arrangement comprising a second inverter in a first embodiment, to the output of which the transmission line is connected, and an output transformer, the secondary windings of which are connected to the three-phase public supply network.

While FIG. 2 shows the circuitry of the energy transmission installation, which is installed at the generation location, the circuit installed at the feed-in location is illustrated in FIGS. 3 and 4.

In the embodiment shown in FIG. 3 the transmission line 14 is connected by way of disconnecting switches 46 and fuses 48 to the filter 16 and the subsequent second inverter 18.

The filter 16 also serves for smoothing the high DC voltage transmitted on the transmission line 14 and in the illustrated embodiment comprises two capacitors 16a, 16b which, similarly to the capacitors 38, are each of the same impedance and are connected in series with each other and in parallel jointly between the positive and negative limbs, with the connecting point P2 being at ground potential.

The second inverter 18 involves a conventional three-phase inverter which in principle is of a similar design configuration to the first inverter 8.

Connected to the output of the second inverter 18 is a further filter 50 which has inductors connected into each phase, for current smoothing purposes.

The AC voltage produced by the second inverter 18 from the high DC voltage is fed by way of the filter 50 and an output transformer 52 connected thereto into the three-phase public supply network 20. Accordingly, the output transformer 52 is also of a three-phase nature, both the primary windings Wp and also the secondary windings Ws being respectively connected in a star configuration in the view shown in FIG. 3. It will be appreciated that it is also possible for the windings of the output transformer 52 to be connected in a delta configuration. The output transformer 52 serves for potential separation. A further function of the output transformer 52 can be that of transforming the AC voltage produced by the second inverter 18 to an effective value which corresponds to that of the AC voltage of the supply network 20.

Having regard to the high DC voltage which is fed in by the transmission line, the high-voltage switches of the second inverter 18 must have a correspondingly high dielectric strength.

As the dielectric strength relative to ground potential, for the transmission cable 14, crucially determines the price and technical viability, that value should be precisely defined. For that reason, voltage values of +Ud=+50 kV and −Ud=−50 kV in relation to ground potential appear to be appropriate.

Figure 4A:
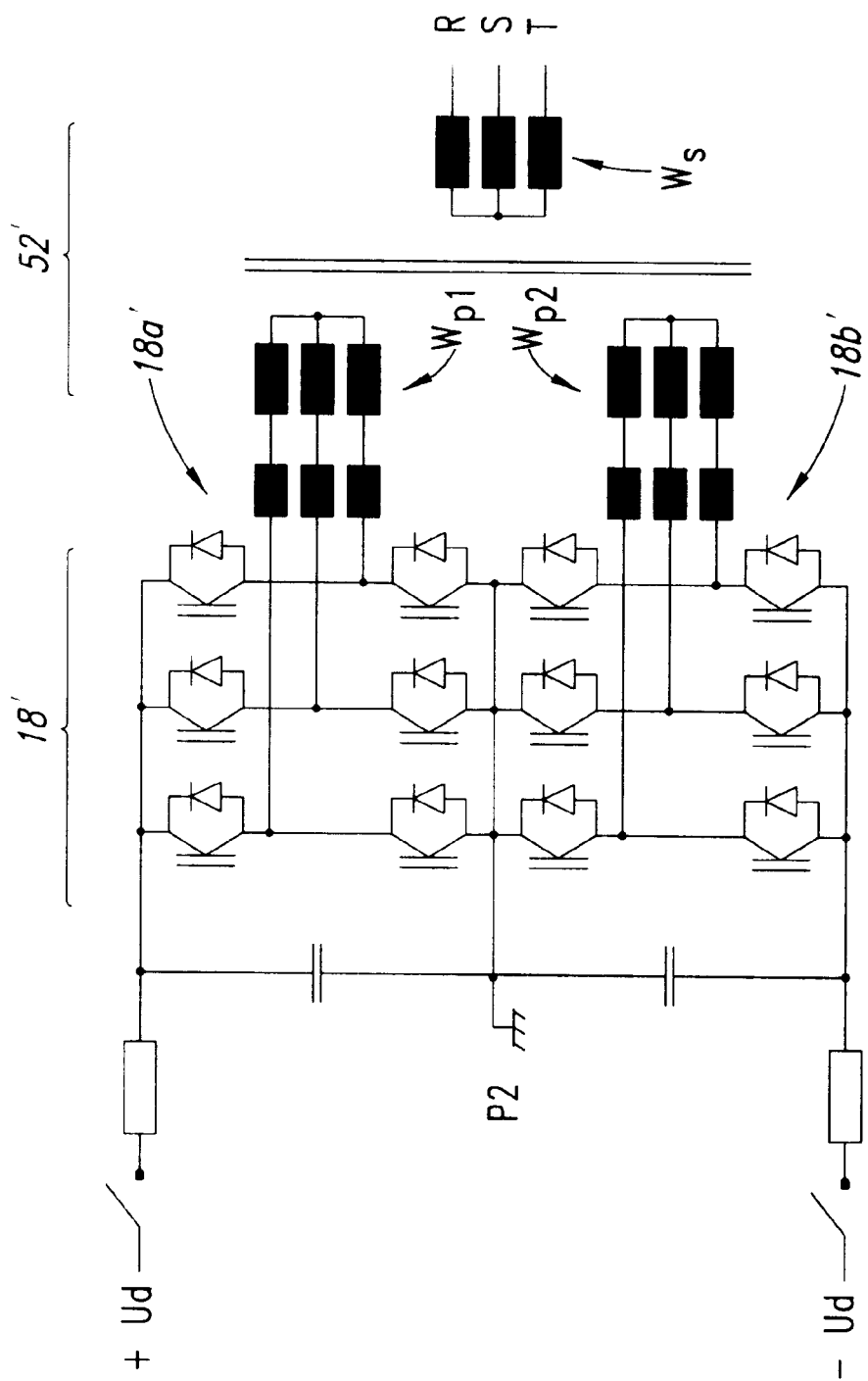
FIGS. 4A and 4B show the circuit diagram of FIG. 3 with a modified second inverter in a second embodiment (FIG. 4A) and a third embodiment (FIG. 4b).

In order to halve the dielectric strength at the high-voltage switches, as an alternative an inverter concept as shown in FIG. 4A is proposed. This concept provides an inverter 18' with two inverter portions 18a' and 18b' in series connection, wherein the connecting point between the two inverter portions 18a' and 18b' is connected together with the connecting point P2 and is thus at ground potential. As a result the inverter portions 18a' and 18b' each need to have only half of the dielectric strength of the (single) inverter 18 shown in FIG. 3. The two partial voltages +Ud and −Ud are regulated by the output currents of the inverter portions 18a' and 18b'; if for example the positive partial DC voltage +Ud is too high, the output current of the associated inverter portion 18a' is regulated to be correspondingly higher, and vice-versa. The partial AC voltages produced by the two inverter portions 18a' and 18b' are added on the primary side by the output transformer 52', by virtue of the output of the first inverter portion 18a' being connected to first primary windings Wp1 and the output of the second inverter portion 18b' being connected to second primary windings Wp2 and the first and second primary windings Wp1 and Wp2 being inductively coupled in series.

Figure 4B:
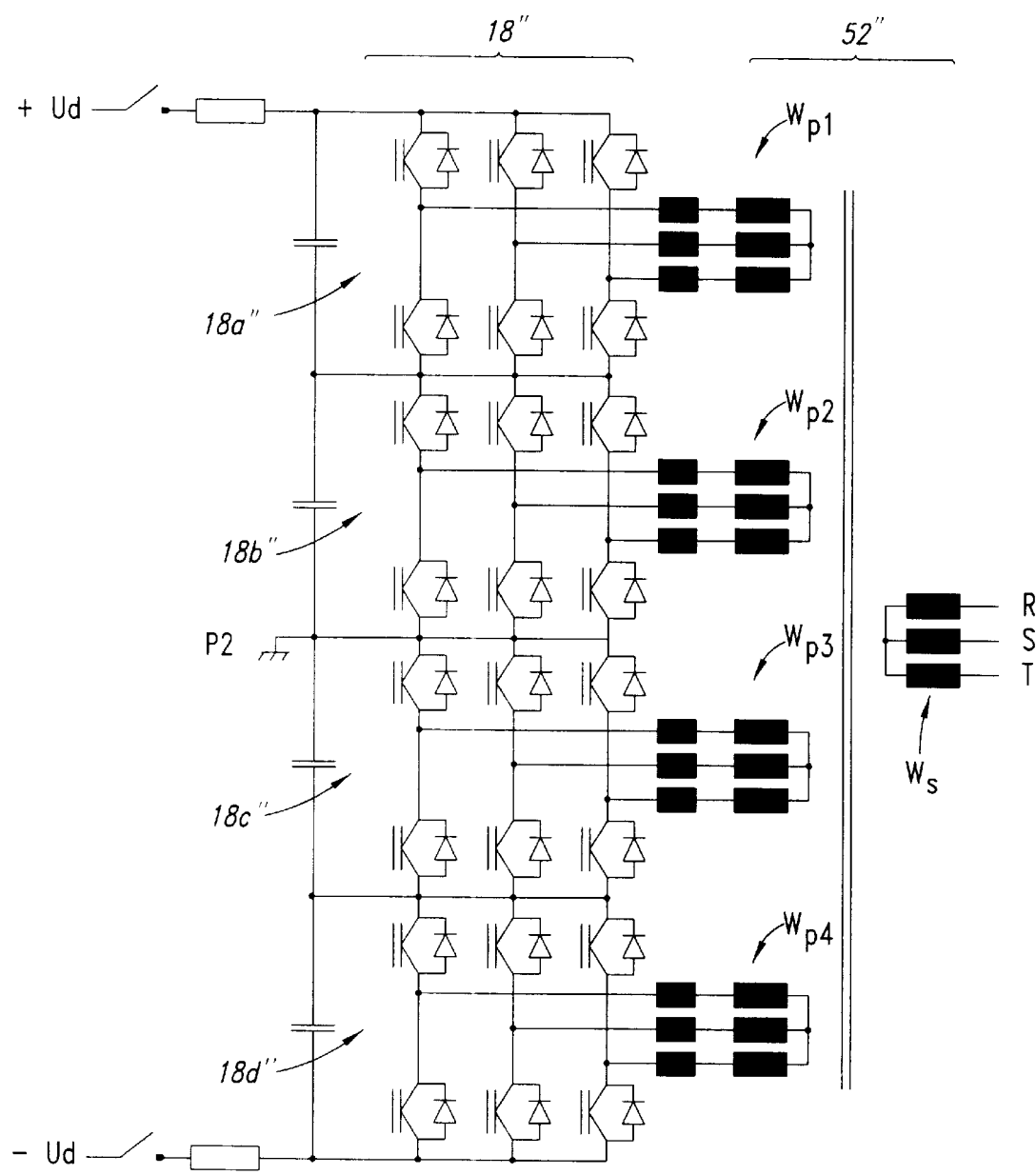

FIG. 4B shows a further embodiment of an inverter 18" in which four inverter portions 18a', 18b', 18c' and 18d' are connected in series, wherein the connecting point between the second inverter portion 18b" and the third inverter portion 18c" is connected to the connecting point P2 and is at ground potential. In that way the dielectric strength for each inverter portion can be reduced once again by half in comparison with the embodiment shown in FIG. 4A and thus reduced to a quarter in comparison with the embodiment shown in FIG. 3. Accordingly, the output transformer 52" of this embodiment has four primary windings Wp1, Wp2, Wp3 and Wp4 which are inductively coupled in series with each other and which are correspondingly connected to the outputs of the inverter portions. The inverter design configuration shown in FIG. 4B operates in the same manner as that shown in FIG. 4A.

What is claimed is:

1. Apparatus for the transmission of electrical energy from a generator which produces a first ac voltage by way of a direct current transmission line to an electrical ac voltage network, having a circuit arrangement comprising a first rectifier, a booster connected on the output side thereof, and a first inverter which is in turn connected on the output side of the booster, wherein the first rectifier converts the first ac voltage produced by the generator into a first dc voltage, the booster transforms the first dc voltage into a constant dc voltage and the first inverter converts the constant dc voltage made available by the booster into a second ac voltage.

2. An installation as set forth in claim 1 characterized in that the current converter circuit and/or the first rectifier regulates to a constant value the first dc voltage which is fed into the transmission line, so that the direct current fed into the transmission line changes as a function of the transmitted electrical power.

3. An installation as set forth in claim 1 characterized in that the current converter circuit converts the first ac voltage into a third ac voltage whose frequency is higher than that of the first ac voltage.

4. An installation as set forth in claim 1 characterized in that the current converter circuit converts the first ac voltage into a third ac voltage whose frequency is in the range of between about 500 and 20,000 Hz.

5. An installation as set forth in claim 1 characterized in that the current converter circuit converts the first ac voltage into a single-phase third ac voltage.

6. An installation as set forth in claim 1 characterized in that the current converter circuit has a second rectifier which converts the first ac voltage produced by the generator into a second dc voltage and a second inverter which converts the second dc voltage produced by the second rectifier into the third ac voltage.

7. An installation as set forth in claim 5 characterized in that the second inverter is a single-phase inverter.

8. An installation as set forth in claim 6 characterized in that connected between the second rectifier and the second inverter is a booster which transforms the second dc voltage into a constant dc voltage.

9. An installation as set forth in claim 6 characterized in that the first rectifier converts the fourth ac voltage into a first dc voltage which is higher than the second dc voltage.

10. An installation as set forth in claim 1 characterized in that the first rectifier converts the fourth ac voltage into a first dc voltage which is in the range of between 10 and 500 kV.

11. An installation as set forth in claim 1 characterized in that the first transformer converts the third ac voltage into a fourth ac voltage at a higher amplitude than that of the third ac voltage.

12. An installation as set forth in claim 1 characterized in that a filter is connected between the current converter circuit and the first transformer.

13. An installation as set forth in claim 12 characterized in that the filter has at least one series-connected inductor and at least one parallel-connected capacitor.

14. An installation as set forth in claim 1 characterized in that at least one capacitor is connected towards ground between the first rectifier and the transmission line and/or between the transmission line and the first inverter.

15. An installation as set forth in claim 1 characterized in that the first inverter is formed from a plurality of series-connected inverter portions.

16. An installation as set forth in claim 15 characterized in that the first inverter is formed from a plurality of series-connected inverter portions of even number and the connecting point between the first half of the number and the second half of the number of inverter portions is at ground potential M.

17. An installation as set forth in claim 1 characterized in that the first inverter is connected to the ac voltage network by way of a second transformer.

18. An installation as set forth in claim 17 characterized in that the second transformer has a plurality of inductively series-coupled primary winding arrangements corresponding to the number of inverter portions and a common secondary winding arrangement, wherein a respective primary winding arrangement is connected to each inverter portion.

* * * * *